Oct. 5, 1954  H. H. WITTENBERG  2,691,158
PEAK VOLTAGE INDICATING AND MEASURING SYSTEM
Filed Nov. 29, 1949
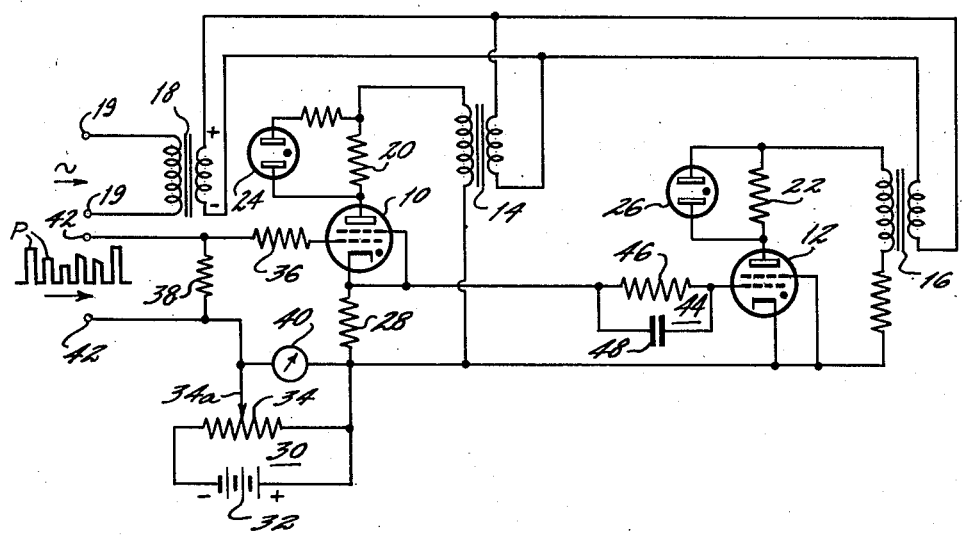
Inventor
HUBERT H. WITTENBERG
By Morris Rabkin
Attorney Patented Oct. 5, 1954

2,691,158

UNITED STATES PATENT OFFICE 2,691,158

PEAK VOLTAGE INDICATING AND MEASURING SYSTEM

Hubert H. Wittenberg, Lancaster, Pa., assignor to Radio Corporation of America, a corporation of Delaware Application November 29, 1949, Serial No. 130,051

6 Claims. (Cl. 340—253)

This invention relates to improvements in voltage measuring apparatus, and particularly to apparatus for determining maximum and minimum peak values of electrical pulses.

In making electrical measurements, it often is necessary to determine the maximum and minimum peak values of pulsating voltages of varying amplitude. For example, in determining the control characteristics of a gas tube, such as an excitron or the like, in measuring vacuum tube noise characteristics, resistor and atmospheric noise characteristics, and nucleonic radiation, it is often essential to determine the maximum and minimum peak values of voltage pulses of randomly varying magnitude.

It is, accordingly, a general object of the present invention to provide an apparatus for measuring electrical phenomena of the foregoing type.

A more specific object of the invention is to provide an electrical measuring apparatus wherein on-off indicators are utilized to facilitate measurement of maximum and minimum electrical pulse values.

In accordance with the invention, the foregoing and other related objects and advantages are attained by providing a circuit containing two electron tubes energized with alternating voltages and so interrelated that only one of the two tubes is conducting at any given time. The two tubes are so arranged that one of the tubes conducts substantially continuously when the pulses being measured are almost all larger than a predetermined minimum value, while the other tube conducts substantially continuously when the pulses being measured are almost all smaller than a predetermined maximum value. On-off indicators connected to each of the tubes provide readily perceptible indications when the circuit is in either of the two stated conditions.

A more complete understanding of the invention can be had by reference to the following description of an illustrative embodiment thereof when considered in connection with the accompanying drawing, the single figure of which is a schematic diagram of apparatus arranged in accordance with the invention.

Referring particularly to the drawing, the apparatus shown comprises two tetrode-type gas filled electron tubes 10, 12, each furnished with alternating anode voltage through a pair of transformers 14, 16. The primary windings of the transformers are connected to a transformer 18 in opposite phase relation and the transformer 18 is connected to any suitable source of alternating voltage (not shown) through a pair of terminals 19. Consequently, the two gas tubes 10, 12 will receive positive half-cycles of anode voltage alternately, so that only one of the gas tubes can be conductive at any given time.

The gas tubes 10, 12 each have an on-off indicator connected in circuit therewith to respond to current conduction in the tubes. For example, resistors 20, 22 are shown connected in series with the tubes 10, 12, respectively, and so-called neon "glow" tubes 24, 26 are connected in parallel with the anode load resistors 20, 22, respectively. When either gas tube is conducting, the indicator associated therewith will be energized by the voltage developed across the load resistor of the conducting tube.

One of the gas tubes 10, has its cathode connected through a resistor 28 to a source of variable bias voltage 30, shown as a battery 32 having a potentiometer 34 connected in shunt therewith. The control grid of the gas tube 10 is connected to the potentiometer arm 34a through a grid current limiting resistor 36 and a grid return resistor 38, and a voltmeter 40 is connected across the output side of the bias voltage source 30 to measure the effective bias applied to the tube 10.

The voltage pulses P to be measured are applied to the apparatus through a pair of input terminals 42 connected to opposite ends of the grid return resistor 38, so that the tube 10 will conduct current only when one or more of the incoming pulses has a higher peak voltage value than the selected value of bias voltage applied to the tube 10.

The second gas tube 12 has its cathode connected to one end of the cathode load resistor 28 of the first gas tube 10, and the control grid of the tube 12 is connected to the cathode end of the cathode load resistor 28 through a self-bias network 44 comprising the parallel combination of a resistor 46 and a capacitor 48. The RC time constant of the network 44 should be slightly greater than one half the period of the alternating anode voltage, for a purpose to be described hereinafter.

In considering the operation of the apparatus, it can be seen that when a high value of bias voltage is selected for the first gas tube 10, by the setting of the potentiometer arm 34a, the tube 10 will not conduct any current, and its indicator 24 will be extinguished. At the same time, the grid and cathode of the second gas tube 12 will be substantially at the same potential, so that the tube 12 will ignite on each positive half-cycle of voltage applied to the anode thereof thru the transformer 16, thereby energizing the indicator 26. Due to persistence of vision, the indicator 26 will appear to be energized continuously under the circumstances just described.

By gradually reducing the bias on the first gas tube 10, a bias value eventually will be reached at which the largest incoming pulses will overcome the bias voltage and cause the tube 10 to fire occasionally, thereby causing the indicator 24 to flash, indicating that the largest incoming pulses are just large enough to overcome the bias voltage from the source 30. Each time that the tube 10 fires, the resulting voltage pulse developed across its cathode resistor 28 will be applied to the grid of the second gas tube 12 through the bias network 44. These positive pulses will cause the tube 12 to draw grid current, thereby charging the capacitor 48 with a negative charge on the grid side of the capacitor.

As was stated, the time constant of the resistor-capacitor combination in the bias circuit 44 is made slightly larger than one half the period of the alternating anode voltage. Hence, the capacitor 48 will hold a charge developed therein during the next succeeding positive half-cycle of voltage on the anode of the tube 12, and the tube 12 will be held cut off for one-half cycle, so that the indicator 26 associated therewith will be deenergized momentarily. However, the occasional "on" condition of the first indicator 24 is much easier to detect than the occasional "off" condition of the second indicator 26. Hence, the first indicator 24 will be relied on to provide an indication of circuit conditions corresponding to maximum pulse input voltage, and the reading of the voltmeter then will be substantially equal to the maximum peak value of the applied voltage pulses.

Having established the maximum peak value of the incoming pulses in the foregoing manner, the bias on the first gas tube 10 now is decreased by further adjustment of the potentiometer arm 34a, causing the first gas tube 10 to ignite more frequently, and causing the second tube 12 to be cut off for a greater proportion of the time than was previously the case. Eventually, a bias value will be reached at which the first indicator 24 will appear to be energized continuously, while the second indicator 26 will appear to be off substantially all of the time but will resond occasionally. This condition will indicate that almost all of the incoming pulses are firing the first tube 10, which means that the bias voltage on the tube 10 is only slightly more negative than the minimum peak value of the incoming voltage pulses. That is, if the bias voltage on the tube 10 were to be decreased only a slight amount more, all of the incoming pulses would be effective to fire the tube 10, the first indicator 24 would respond continuously, and the second indicator 26 would remain deenergized all the time. Consequently, the reading of the voltmeter 40 now will be proportional to the minimum peak value of the incoming pulses.

Accordingly, it can be seen that an occasional "off" cycle of either tube, 10 or 12, which would be relatively difficult to detect, will appear as an occasional "on" cycle of the other tube, and can be detected readily by resonse of the indicator associated with that tube to indicate the condition of the circuit.

What is claimed is:

1. In an apparatus for determining the maximum and minimum peak values of voltage pulses, in combination, a first circuit, a source of alternating current potential, means including an impedance for connecting said source to said apparatus, a source of voltage pulses to be measured, means whereby said first circuit is conductively responsive only to pulses of peak value greater than a selectable predetermined magnitude from said voltage pulse source, a second circuit, means including an impedance for connecting said second circuit in reversed phase to said alternating voltage source, means connecting said circuits to cut off current flow in said second circuit in response to current flow through said first circuit, said means including an impedance element in said first circuit across which to develop a voltage by current flow through said first circuit, and means to indicate current flow in each of said circuits.

2. In an apparatus for measuring maximum and minimum values of voltage pulses, in combination, a pair of input terminals adapted to be connected to a source of voltage pulses to be measured, a source of alternating voltage of frequency less than the recurrence rate of said pulses, a first gas filled tube connected to receive a first alternating operating voltage from said source, a second gas filled tube connected to receive a second alternating voltage from said source and normally conductive during each positive half cycle of said second alternating voltage, said first and second voltages being of opposite phase, means to indicate current flow in each of said tubes, means to initiate current flow in said first tube in response to the receipt of voltage pulses of greater than predetermined magnitude, and means connecting said tubes to cut off current flow in said second tube in response to current flow in said first tube.

3. In an apparatus for determining the maximum and minimum peak values of pulsating voltages of differing peak magnitude, in combination, a source of alternating voltage, a first gas filled tube having anode and cathode electrodes, a circuit connecting said first tube to said source to apply a first alternating voltage between said electrodes, a second gas filled tube having anode and cathode electrodes, a circuit connecting said second tube to said source to apply between said second tube electrodes a second alternating voltage opposite in phase to said first alternating voltage, means to indicate current flow in each of said tubes, means to establish current flow in said first tube only in response to a voltage pulse of greater than predetermined magnitude, and means connecting said tubes to interrupt current flow in said second tube in response to current flow in said first tube.

4. In an apparatus for determining the maximum and minimum peak values of voltage pulses, in combination, a source of alternating current potential, a first pair of terminals including a first impedance adapted to be connected to said source, a second pair of terminals including a second impedance adapted to be connected to a source of voltage pulses to be measured, a first circuit connected to said terminals and means whereby said first circuit is conductively responsive only to pulses of peak value greater than a selectable predetermined magnitude from said voltage pulse source, a second circuit connected in reverse phase to said first pair of terminals, means connecting said circuits to cut off current flow in said second circuit in response to current flow through said first circuit, said means including an impedance element in said first circuit across which to develop a voltage by current flow through said first circuit, and means to indicate current flow in each of said circuits.

5. In an apparatus for determining the maximum and minimum peak values of voltage pulses, in combination, a pair of gas filled tubes each having at least an anode, a grid, and a cathode, a first and a second circuit each including one of said tubes, means in said circuits connecting the anodes and the cathodes of said tubes across a source of alternating operating voltage, means connecting said first circuit to said second circuit tube to prevent current flow through said second circuit tube in response to current flow through said first circuit tube, means in said first circuit to indicate current flow through said first circuit tube, means in said second circuit to indicate current flow through said second circuit tube, means in said first circuit to connect said first circuit to a source of said voltage pulses to be measured, and means in said first circuit to initiate current flow in said first tube only when the voltage pulses applied to the grid thereof are of a greater than predetermined magnitude.

6. In an apparatus for determining the maximum and minimum peak values of voltage pulses of similar polarity, in combination, a first and a second gas filled tube each having an anode, a cathode and a control grid, means to connect said anodes and said cathodes to an alternating voltage source, means to initiate pulsating current flow through said first tube only when voltage pulses of predetermined magnitude are applied between said first tube control grid and cathode, means coupling said second tube control grid and cathode to said first tube to cut off current flow through said second tube when current flows through said first tube, and means coupled to each said tube to indicate current flow through said tubes.

References Cited in the file of this patent

UNITED STATES PATENTS

| Number | Name | Date |
|---|---|---|
| 2,050,250 | Aggers | Aug. 11, 1936 |
| 2,125,992 | Collings | Aug. 9, 1938 |
| 2,139,474 | Shepard | Dec. 6, 1938 |
| 2,185,192 | Hansell | Jan. 2, 1940 |
| 2,249,323 | Mitchell | July 15, 1941 |
| 2,299,272 | Hallden | Oct. 20, 1942 |
| 2,403,988 | Likel | July 16, 1946 |
| 2,422,766 | Alexander | June 24, 1947 |
| 2,547,511 | Weissman | Apr. 3, 1951 |